United States Patent

[11] 3,581,291

[72] Inventors Shoji Iwamoto
Totsuka-ku;
Hisashi Horikoshi, Tachikawa-shi, both of, Japan

[21] Appl. No. 872,164
[22] Filed Oct. 29, 1969
[45] Patented May 25, 1971
[73] Assignee Hitachi, Ltd.
Tokyo, Japan
[32] Priority Oct. 31, 1968
[33] Japan
[31] 43/79555

[54] MEMORY CONTROL SYSTEM IN MULTI-PROCESSING SYSTEM
13 Claims, 6 Drawing Figs.

[52] U.S. Cl. .......... 340/172.5
[51] Int. Cl. .......... G06f 15/16
[50] Field of Search .......... 340/172.5

[56] References Cited

UNITED STATES PATENTS 3,218,611 11/1965 Kilburn et al. .......... 340/172.5
3,248,702 4/1966 Kilburn et al. .......... 340/172.5
3,339,183 8/1967 Bock .......... 340/172.5
3,387,274 6/1968 Davis .......... 340/172.5
3,395,392 7/1968 Kulikauskas et al. .......... 340/172.5
3,422,401 1/1969 Lucking .......... 340/172.5
3,435,420 3/1969 Wissick .......... 340/172.5

*Primary Examiner*—Paul J. Henon
*Assistant Examiner*—R. F. Chapuran
*Attorney*—Craig, Antonelli, Stewart and Hill

ABSTRACT: A multiprocessing system comprises two processors and a main memory to be utilized by the processors in common. Each processor is provided with a buffer memory which stores information read from the main memory, block by block, and the main memory is provided with a key memory which stores an indicator indicating whether or not information in the main memory is read out and stored in each processor at each predetermined amount of its capacity (sector). When one of the processors carries out a writing in a sector of the main memory, whether or not the information of the sector is stored in the other processor is checked. When the information is stored, the address of the information is supplied to the other processor to invalidate the corresponding sector of the buffer memory. In this manner, the incoincidence between the stored contents of the main memory and buffer memory is prevented.

INVENTORS

SHOJI IWAMOTO and HISASHI HORIKOSHI

BY Craig, Antonelli, Stewart & Hill

ATTORNEYS

INVENTORS

SHOJI IWAMOTO and HISASHI HORIKOSHI

BY
Craig, Antonelli, Stewart & Hill
ATTORNEYS

INVENTORS

SHOJI IWAMOTO and HISASHI HORIKOSHI

BY

Craig, Antonelli, Stewart & Hill

ATTORNEYS

INVENTORS

SHOJI IWAMOTO and HISASHI HORIKOSHI

BY Craig, Antonelli, Stewart & Hill

ATTORNEYS

MEMORY CONTROL SYSTEM IN MULTI-PROCESSING SYSTEM

BACKGROUND OF THE INVENTION

1. Field of the Invention

The present invention relates to a memory control system in a computer having a processor provided with a buffer memory, and more particularly to a memory control system in a multiprocessing system.

2. Description of the Prior Art

A method of improving an equivalent access time of an overall memory by providing a low capacity high-speed accessible buffer memory between a main memory and a processor has been proposed by D. H. Gibson, in "Consideration in Block-Oriented Systems Design," S. J. C. C., 1967, and this has proved effective.

When the processor reads fresh information from the main memory by the above-mentioned method, a block of information including the read information is written in the buffer memory. When a read request is made by the processor to the buffer memory, whether or not the required information is stored in the buffer memory is first checked, and if the information is stored, the information is read from the buffer memory. When the information is not stored in the buffer memory, the information is read from the main memory.

When the above-mentioned method is applied to a multiprocessing system, the following problem arises. That is, when a certain processor makes a writing in the main memory so as to modify the content of certain information, another processor may have read the information from the main memory and stored it in the buffer memory, since each processor gains access to the main memory independently of other processors. In such a case it is necessary to make the contents of the information in the main memory and buffer memory coincide with each other by making special provisions.

A general method of settling the above problem is such that when a certain processor performs a writing in the main memory, an address signal is supplied to other processors to check whether or not information corresponding to the address is stored in the buffer memory, and when the information is stored in the buffer memory, this information is made invalid.

However, such a method has the disadvantages that the number of signal lines between the processors increases as the degree of multiplicity of the processors increases, resulting in the difficulty of interconnection between the processors, and that all the buffer memories must be checked at each time a writing in the main memory is made for providing against a very rare affair that information which a certain processor rewrites happens to be stored in the buffer memory of another processor, resulting in a degradation of the processing speed.

SUMMARY OF THE INVENTION

An object of the present invention is to provide a memory control system which prevents the incoincidence of the contents of a main memory and a buffer memory in a multiprocessing system.

Another object of the present invention is to provide a memory control system which prevents the incoincidence of information when the information in a main memory to be rewritten has already been stored in a buffer memory.

A further object of the present invention is to provide a memory control system which checks on a main memory side whether or not information in a main memory has already been read and written in a buffer memory.

The present invention is characterized in that an indicator for indicating whether or not information in a main memory is read from the main memory and stored in a buffer memory is provided at each constant capacity of the main memory, every time the content of the main memory is read and written in the buffer memory the corresponding indicator is turned on, and each time a writing in the main memory is carried out the content of said corresponding indicator is checked to invalidate the information in the buffer memory which has been turned on.

DESCRIPTION OF THE PREFERRED EMBODIMENTS

Figure 1:
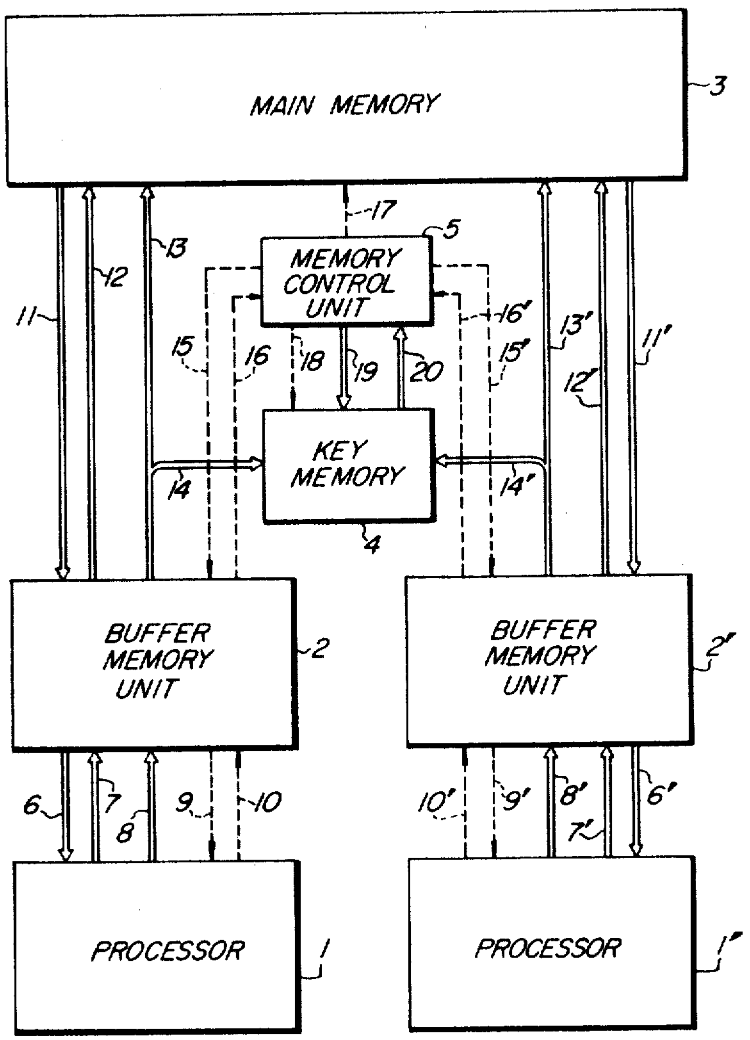
FIG. 1 is a block diagram of an embodiment of the present invention.

FIG. 1 shows a multiprocessing system having two processors. Reference numerals 1 and 1′ designate processors, 2 and 2′ designate buffer memory units, 3 designates a main memory to be utilized in common by the processors 1 and 1′, 4 designates a key memory including a plurality of indicators, and 5 designates a memory control unit for the main memory and key memory. The main memory 3, the key memory 4 and the memory control unit 5 constitute a main memory unit as will later be described in detail.

Between the processor 1 (or 1′) and the buffer memory unit 2 (2′) there are provided data lines 6 and 7 (6′ and 7′), an address line 8 (8′) and control lines 9 and 10 (9′ and 10′). Data corresponding to an address signal supplied from the processor 1 (1′) to the buffer memory unit 2 (2′) through the address line 8 (8′) are transmitted between the processor 1 (1′) and the buffer memory unit 2 (2′) through the data lines 6 and 7 (6′ and 7′) by being controlled by control signals passing through the control lines 9 and 10 (9′ and 10′).

As will later be described in detail, if the control signal from the processor 1 (1′) is a read request, the buffer memory unit 2 (2′) checks whether or not the information corresponding to the address supplied from the processor 1 (1′) to the buffer memory unit 2 (2′) through the address line (8′) is read from the main memory 3 and stored in the buffer memory unit 2 (2′). When the information is stored in the buffer memory unit 2 (2′), the buffer memory unit 2 (2′) reads out the information from itself and supplies the read out data to the processor 1 (1′) through the data line 6 (6′). When the information is not stored in the buffer memory unit 2 (2′), the buffer memory unit 2 (2′) supplies a read request to the main memory 3.

If the control signal from the processor 1 (1′) is a write request, the buffer memory unit 2 (2′) at once makes a write request to the main memory 3, and, at the same time, checks whether or not the information of the address to be rewritten has been written in the buffer memory unit 2 (2′). When the information has been written in the buffer memory unit 2 (2′), the buffer memory unit 2 (2′) carries out the rewriting of the information stored therein.

Between the buffer memory unit 2 (2′) and the main memory 3 there are provided data lines 11 and 12 (11′ and 12′) and an address line 13 (13′). Between the buffer memory unit 2 (2′) and the memory control unit 5 there are provided control lines 15 and 16 (15′ and 16′). The most significant bits of an address signal to be supplied from the buffer memory unit 2 (2′) to the main memory 3 is supplied to the key memory 4 through a signal line 14 (14′). The memory control unit 5 controls the main memory 3 and the key memory 4 through signal lines 17 and 18, respectively. The memory control unit 5 supplies a rewrite signal through a signal line 19 to the key memory 4 which in turn supplies information to be checked to the memory control unit 5 through a signal line 20.

In operation of the main memory unit, when the buffer memory unit 2 (2′) supplies a read request to the memory control unit 5 through the control line 16 (16′) and supplies an address signal to the main memory 3 and the key memory 4 through the address lines 13 and 14 (13' and 14'), the memory control unit 5 enables the main memory 3 to perform a read control cycle by a train of control signals supplied through the control line 17, and enables the key memory 4 to perform a write control cycle by a train of control signals fed through the control line 18. Information read from the main memory 3 is transmitted to the buffer memory unit 2 (2') through the data line 11 (11') to be stored therein. Information for turning on the indicator of the processor 1 (1') making the read request is supplied to the key memory 4 through the signal line 19 to be stored therein.

When supplied with a write request through the control line 16 (16'), the memory control unit 5 generates control signals which are supplied to the main memory 3 and the key memory 4 through the control lines 17 and 18 to enable the main memory 3 and the key memory 4 to perform a write control cycle and a read control cycle, respectively. Consequently, fresh information is written in the main memory 3 through the date line 12 (12') at the location specified by an address signal supplied through the address line 13 (13'). From the key memory 4 the indicator of the address specified by an address signal on the address line 14 (14') is read and supplied to the memory control unit 5 through the signal line 20. When the corresponding indicator of the other processor 1' (1) is on, a signal for invalidating the information in the buffer memory unit 2' (2) specified by the address signal is fed to the buffer memory unit 2' (2) through the control line 15' (15). At this time it is possible to transmit the address signal to the buffer memory unit 2' (2) through the data line 11' (11).

Although the control line is denoted by one dotted line in FIG. 1, it is customary to employ separate signal lines for respective control signals.

Figure 2:
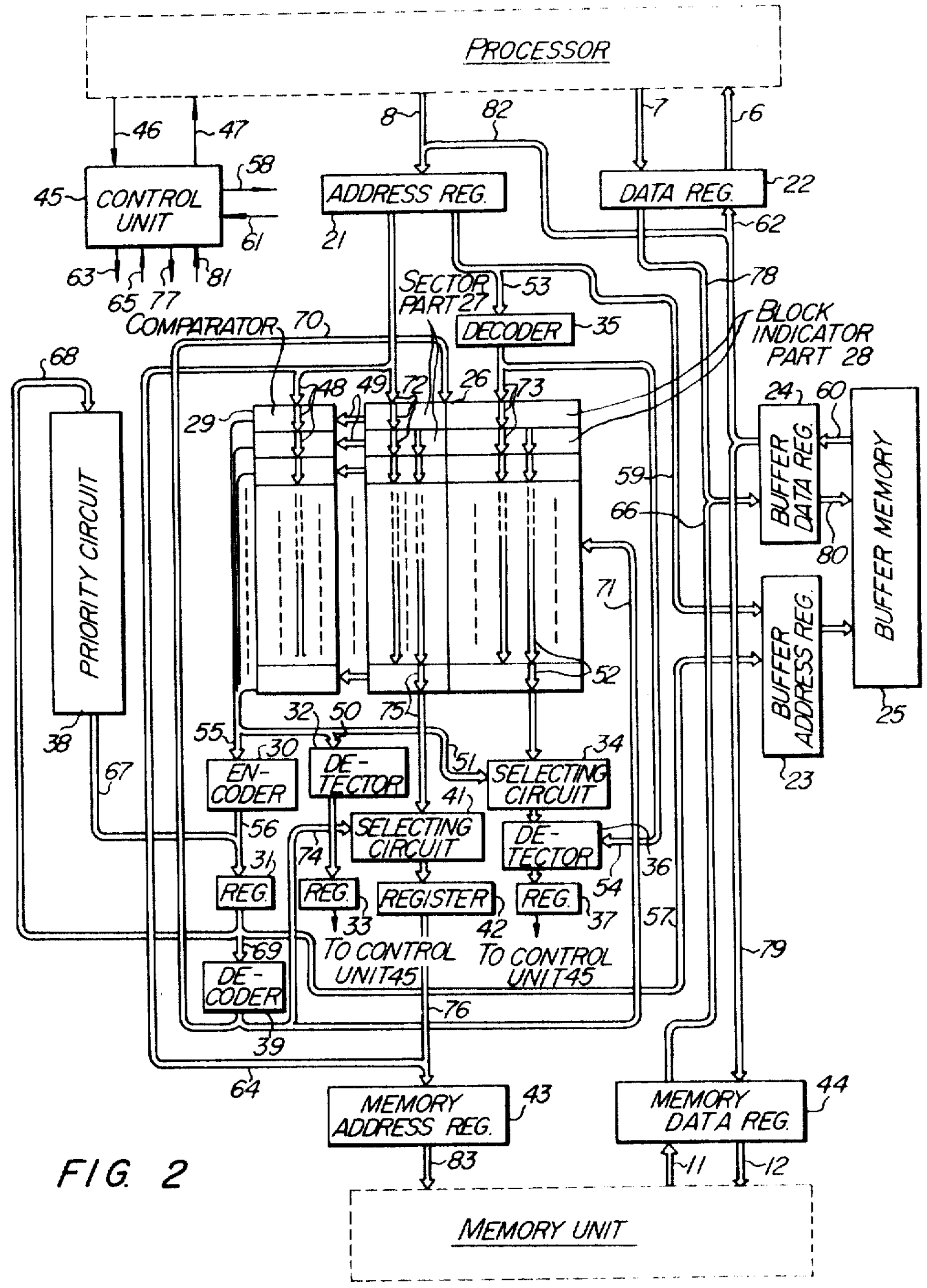
FIG. 2 is a block diagram of an important part of the embodiment of FIG. 1.

FIG. 2 shows a detailed construction of the buffer memory unit 2 in FIG. 1. Reference numeral 21 designates an address register, 22 designates a data register, 23 designates a buffer address register, 24 designates a buffer data register, and 25 designates a buffer memory. Though not shown, the buffer memory 25 is divided into several or 10 odd sectors, each of which in turn consists of 10 odd or several tens of blocks. In each sector information of a predetermined capacity of serial addresses in the main memory 3 is stored, and in each block information of a series of several words read en bloc from the main memory 3 is stored. That is, the sector is of 1 KB (kilo byte), and the block is of 32 B (byte), for example.

An associative register 26 consists of a plurality of registers corresponding to the sectors of the buffer memory 25, each register consisting of a sector part 27 in which the most significant bits of the address signal corresponding to the sector are to be set and a block indicator part 28 which indicates which block in the sector is read and stored in the buffer memory 25. A comparator 29 compares the most significant bits of the address signal set in each sector part 27 and an address signal fed from the address register 21, and generates an output signal when there is coincidence therebetween for each sector.

Reference numerals 30 designates an encoder for converting an output signal from the comparator 29 into an address signal designating a sector in the buffer memory 25, and numeral 31 designates a register for setting the address signal. Reference numeral 32 designates a detector for detecting whether or not there is a coincident signal in the output signal from the comparator 29, and reference numeral 33 designates a register in which the result of the detection is set.

A selecting circuit 34 selects the block indicator part 28 of the sector for which the output signal of the comparator 29 indicates the coincidence. A decoder 35 decodes the bits corresponding to the block of an address signal. Reference numeral 36 designates a detector for detecting whether or not a block, specified by an output signal from the decoder 35, in the block indicator selected by the selecting circuit 34 is turned on, and 37 designates a register in which the detected output signal is set.

A priority circuit 38 determines in which sector of the buffer memory 25 information freshly read from the main memory 3 should be stored. The priority circuit 38 specifies, when all the sectors of the buffer memory 25 are occupied, the sector in which the information stored was utilized earliest, i.e. the sector of the lowest priority. A decoder 39 converts sector addresses set in the register 31 into signals specifying respective sectors. An output signal from the decoder 39 is supplied to the block indicator parts 28 through a signal line 71 to reset all bits of the block indicator of the specified sector synchronously with a control signal from a control unit 45.

A selecting circuit 41 selects either one of the address signals in the sector parts 27 by an output signal from the decoder 39, and the selected address signal is set in a register 42. Reference numeral 43 designates a memory address register, and 44 designates a memory data register. The control unit 45 controls the buffer memory unit 2.

In operation, when an address signal from the processor 1 is set in the address register 21 through the signal line 8, and a read request in supplied to the control unit 45 through a control line 46, the control unit 45 successively supplies timing signals (not shown) to the parts of the buffer memory unit 2 to initiate a read cycle.

The most significant bits, corresponding to a sector, of an address signal set in the address register 21 are fed to the comparator 29 through a signal line 48, and compared with address signals fed from the sector parts 27 through signal lines 49 to generate a signal designating the sector for which coincidence between the address signals occurred. The output signals from the comparator 29 is supplied to the detector 32 through a signal line 50 to set the register 33 when there is a sector for which the coincidence between the address signals occurs. The output signal from the register 33 is supplied to the control unit 45. When the register 33 is set due to the coincidence of the address signals, the block indicator of the sector for which the coincidence of the address signals occurred is selected from the block indicators supplied through a signal line 52 by the selecting circuit 34 in accordance with output signals from the comparator 29 supplied through a signal line 51. The signal selected by the selecting circuit 34 is supplied to the detector 36. The bits corresponding to the block of the address signal set in the address register 21 are decoded by the decoder 35 and supplied to the detector 36 as a signal specifying the block in the sector. Consequently, among the bits of the block indicator the bit specified by the block signal is detected, and, if the bit indicates the on state, set in the register 37 to be supplied to the control unit 45.

The output signal from the comparator 29 is supplied also the the encoder 30 through a signal line 55 to be converted into an address of the sector in the buffer memory 25, and is then set in the register 31 through a signal line 56. The output signal from the register 31 is supplied through a signal line 57 to the upper part of the buffer address register 23 corresponding to the sector.

Since the information represented by the address signal set in the address register 21 is written in the buffer memory 25 when both registers 33 and 37 are set, the control unit 45 makes a read request to the buffer memory 25 through a signal line 58. To the upper part of the buffer address register 23 is supplied the address of the sector through the signal line 57, and to the lower part of the buffer address register 23 is supplied the address of the block et seq. from the address register 21 through a signal line 59 to be translated into a signal to specify information in the buffer memory 25. Consequently, the address signal is supplied to the buffer memory 25 through a signal line 80, and the read out information is set in the buffer data register 24 through a signal line 60 and a response signal is delivered to the control unit 45 through a signal line 61. The control unit 45 delivers a response signal to the processor 1 through a signal line 47, and, at the same time, sets information read out from the buffer data register 24 in the data register 22 through a signal line 62, and further delivers to the processor 1 through the signal line 6.

When either one of the registers 33 and 37 is not set, the control unit 45 makes a read request to the main memory 3 through a signal line 63. At the same time, an address signal in the address register 21 is set in the memory address register 43 through a signal line 64 and is then supplied to the main memory 3 through a signal line 83. In turn, from the main memory 3 information of one block including the information of the above-mentioned address is read and successively supplied to the memory data register 44 through the signal line 11. Since a response signal is set in the control unit 45 through a signal line 65, the control unit 45 successively sets information serially supplied to the memory data register 44 in the buffer data register 24 through a signal line 66, and further successively writes in a predetermined block of the buffer memory 25 by making a write request to the buffer memory 25 through the signal line 58. At this time, the least significant few bits of the buffer address register 23 are successively rewritten in accordance with signals (not shown) from the control unit 45 so that a series of pieces of information is stored in a predetermined block. When information supplied from the main memory 3 becomes the information of the address stored in the address register 21, the above information is supplied from the buffer data register 24 to the data register 22 through the signal line 62, and further supplied to the processor 1 upon receipt of a response signal from the control unit 45 through the signal line 47.

An address signal for writing information read from the main memory 3 in the buffer memory 25 is set in the buffer address register 23, while the most significant bits of the address signal for specifying the sector is supplied from the register 31. Consequently, when the register 33 is set to indicate the coincidence of sector parts, the address signal of the sector is supplied to the buffer address register 23 through the signal line 57 since the address signal is supplied from the encoder 30 to the register 31 through the signal line 56.

When the register 33 is not set to show the incoincidence of the sector parts, the address signal of the lowest priority sector specified by the priority circuit 38 is set in the register 31 through a signal line 67, and supplied to the buffer address register 23.

The address signal of a sector in the buffer memory 25 set in the register 31 is supplied to the priority circuit 38 through a signal line 68 to become the address signal of the highest priority sector. The output signal from the register 31 is also applied to the decoder 39 through a signal line 69 to be converted into a signal for indicating each sector, and is further supplied to the associative register 26 through a signal line 70 to become a gate signal for setting the sector part 27 and the block indicator part 28 of the associative register 26. The signal for indicating the sector is also supplied to the block indicator part 28 of the associative register 26 through the signal line 71 to reset all bits of the block indicator of the indicated sector synchronously with the control signal from the control unit 45 when both registers 33 and 37 are not set. In accordance with the gate signal supplied through the signal line 70 an address signal corresponding to a sector supplied from the address register 21 through a signal line 72 and a signal specifying the block supplied from the decoder 35 through a signal line 73 are set in the sector part and the block indicator part, respectively, of a predetermined register.

In order to read out information requiring a sector from the main memory 3 and store in the buffer memory 25 when all the sectors of the buffer memory 25 are occupied by informations read out from the main memory 3 and there is no available sector, it is necessary to invalidate the information of a sector to store the information therein. When such a substitution is made, it is effective to turn the corresponding indicator of the key memory 4 (FIG. 1) off or in an available state.

Consequently, as has been described, when at least one of the registers 33 and 37 is not set, the address signal of the lowest priority sector specified by the priority circuit 38 is set in the register 31, and then supplied to the associative register 26 through the decoder 39 and signal lines 70 and 71 and resets all bits of the block indicator part 28 of a specified sector so as to set an address signal and block indicator of information of another sector. The output signal of the decoder 39 is also supplied to the selecting circuit 41 through a signal line 74 to select one of the address signals supplied from the sector parts 27 of the associative register 26 through a signal line 75. The address signal selected by the selecting circuit 41 is set in the register 42, and further set in the memory address register 43 through a signal line 76 to be supplied to the key memory 4 (FIG. 1). From the control unit 45 an indicator reset signal is supplied to the memory control unit 5 (FIG. 1) through a signal line 77.

Next, the operation to be performed when a write request is made by the processor 1 to the control unit 45 through the signal line 46 will be described. Upon receipt of the write request the control unit 45 supplies a timing signal to each part of the buffer memory unit 2 to start a cycle for writing.

In the case of writing, an address signal is set in the address register 21, while a data signal is fed from the processor 1 through the signal line 7 to the data register 22 to be set therein. The address signal is set in the memory address register 43 through the signal line 64, and at once a write request is made from the control unit 45 to the main memory 3 through the signal line 63. The data signal is once set in the buffer data register 24 through a signal line 78, and then set in the memory data register 44 through a signal line 79 and supplied together with the address signal to the main memory 3 through the signal line 12.

The operation of checking the address signal stored in the address register 21 is exactly the same as in the case for reading out. When information represented by the address signal is stored in the buffer memory 25, both of the registers 33 and 37 are set to supply the information to the control unit 45 which in turn makes a write request through the signal line 58 to the buffer memory 25. Consequently, the data signal stored in the buffer data register 24 is supplied to the buffer memory 25 through a signal line 80 to be stored in the address specified by the address signal of the buffer memory 25 set in the buffer address register 23 through the signal lines 57 and 59.

Upon completion of writing in the buffer memory 25 and the main memory 3, response signals are supplied from the buffer memory 25 and the main memory 3 through the signal lines 61 and 65, respectively, to the control unit 45 which in turn supplies a response signal to the processor 1 through the signal line 47 to complete the writing operation.

When the other processor 1' performs a writing in the main memory 3, an indicator is read out from the key memory 4 in FIG. 1. If the indicator indicates the fact that the information of the address just now written in the main memory 3 is read out therefrom and stored in the buffer memory 25, a buffer exception signal is fed from the memory control unit 5 through a signal line 81 to the control unit 45. At this time, the address signal of information to be invalidated is fed to the memory data register 44 through the signal line 11. Consequently, when the control unit 45 initiates the cycle for invalidating the information in the buffer memory 25 upon receipt of the buffer exception signal, the address signal is set in the buffer data register 24 through the signal line 66, and further set in the address register 21 through a signal line 82. The subsequent operation is such that the address signal set in the address register 21 is checked by the address signals in the sector parts 27 of the associative register 26, a signal for specifying the coincident sector is set in the register 31 through the encoder 30, and further supplied from the decoder 39 through the signal line 71 to the block indicator part 28 of the associative register 26 to reset all bits of the block indicator of a predetermined sector.

Although all bits of the block indicator of a sector have been reset in the above-described operation, it is possible to reset only one bit of the block indicator. For this purpose it may be that the reset signal fed through the signal line 71 is gated by a signal for specifying the block resulting from decoding by the decoder 35 bits corresponding to the block of the address signal set in the address register 21, and supplied to a bit representing a predetermined block of the block indicator part 28 of the associative register 26.

Figures 3, 4, 5:
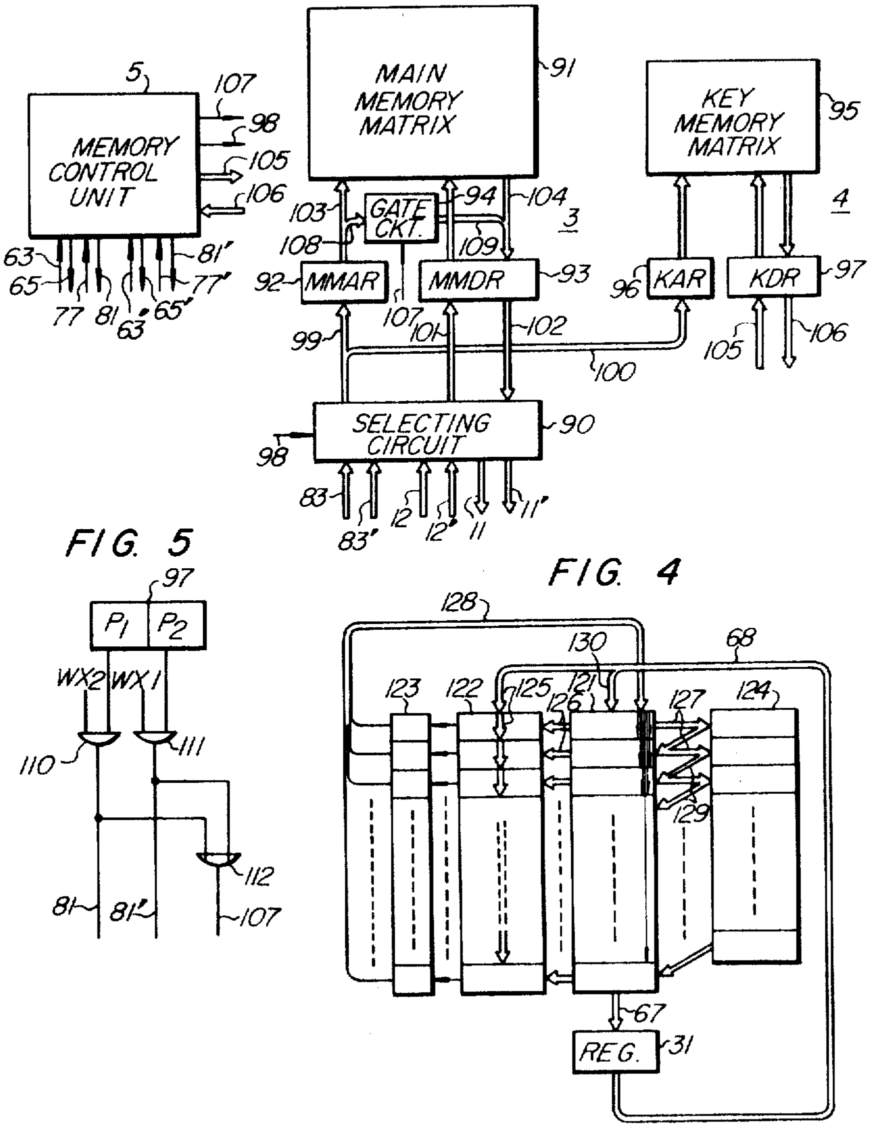
FIG. 3 is a block diagram of another important part of the embodiment of FIG. 1.
FIGS. 4 and 5 are block diagrams of parts of the arrangements of FIGS. 2 and 3, respectively.

FIG. 3 shows a construction of the memory unit of the embodiment of FIG. 1. The memory unit comprises the main memory 3, the key memory 4, a selecting circuit 90, and the memory control unit 5.

The main memory 3 is composed of a main memory matrix 91, a main memory address register (MMAR) 92, a main memory data register (MMDR) 93, and a gate circuit 94.

The key memory 4 is composed of a key memory matrix 95, a key address register (KAR) 96, and a key data register (KDR) 97. This key memory can easily be provided by increasing the bit number of a key memory for memory protection.

To the memory control unit 5 a read request or a write request is made by the buffer memory unit of each processor through the signal line 63 or 63'. Although the memory control unit 5 receives the read or write request from each processor, it cannot simultaneously receive the requests from both processors, Consequently, the memory control unit 5 receives the requests in accordance with a predetermined priority, for example from the processor 1 if the priority of the processor 1 is higher than that of the processor 1', and the request from the process 1' is received only when there is no request from the processor 1 or only after the request from the processor 1 has been processed.

A signal indicating whether the thus received request is from the processor 1 or from the processor 1' is supplied to the selecting circuit 90 through a signal line 98 to select an address signal and a data signal from the processor indicated by the said signal. The selected address signal is supplied to the MMAR 92 and KAR 96 through a signal lines 99 and 100, respectively. The selected data signal is supplied to the MMDR 93 through a signal line 101. The data signal read from the main memory matrix 91 and set in the MMDR 93 is supplied to the selecting circuit 90 through a signal line 102, and supplied to the buffer memory unit of the selected processor by being controlled by a signal supplied through the signal line 98.

When the request received by the memory control unit 5 is a read request, the memory control unit delivers control signals to parts of the memory to cause the main memory to start a control cycle for reading and to cause the key memory to start a control cycle for writing. In the MMAR 92 an address signal selected by the selecting circuit 90 is set through the signal line 99, which address signal is further supplied to the main memory matrix 91 through a signal line 103 to read out the information specified by the address signal, and set in the MMDR 93 through a signal line 104. The said information is supplied to the selecting circuit 90 through the signal line 102, and supplied to the buffer memory unit of the processor which made a read request, and the memory control unit 5 supplies a response signal through the signal line 65 or 65'.

The main memory shown in FIG. 3 is composed of only a main memory matrix and a set of access mechanisms. In fact, it is ordinarily divided into banks, i.e. into a plurality of independently accessible parts in order to read out a block of information at one time. In this case, serial address signals are supplied to each bank, and read out information is serially supplied to the buffer memory unit 2.

On the other hand, the most significant bits corresponding to the sector of the address signal selected by the selecting circuit 90 are set in the KAR 96 of the key memory matrix 95. A signal for turning the indicator of the processor read requested by the memory control unit 5 through a signal line 105 on is set in the KDR 97, and written in the key memory matrix 95.

When the request made to the memory control unit 5 is a write request, the memory control unit 5 enables the main memory to perform a control cycle for writing in, and enables the key memory to perform a control cycle for reading out. In this case, the operation of the main memory is such that a selected data signal is set in the MMDR 93 through the signal line 101, and written in the address indicated by the address signal set in the MMAR 92.

In the key memory, the indicator of each processor is read from the key memory matrix 95 and written in the KDR 97 by the indication of the address signal set in the KAR 96, and supplied to the memory control unit 5 through a signal line 106. If the indicator of the processor which did not make the write request is on, the memory control unit 5 supplies the aforementioned buffer exception signal to the processor through the signal line 81 or 81'. At the same time, the memory control unit 5 supplies a control signal through a signal line 107 to the gate circuit 94 to enable the address signal set in the MMAR 92 to be set in the MMDR 93 through a signal lines 108 and 109. The memory control unit 5 further converts a signal on the signal line 98 into a signal for indicating the processor the indicator of which was on, and supplies the address signal to the buffer memory unit 2 or 2' through the data line 11 or 11'.

The above-described arrangement can likewise be applied to case where information in the main memory can be rewritten by an input device other than the processor to prevent the incoincidence of information.

Although the embodiment of FIGS. 1 to 3 is constructed such that when a writing is performed in the main memory, an address signal to be written in is fed to the buffer memory unit in accordance with the indication of the indicator, it is possible to prevent incoincidence between informations stored in the main memory and the buffer memory without feeding the address signal.

For this purpose, it is sufficient to reset all the block indicator parts 28 of the associative register 27 when a buffer exception signal is supplied through the signal line 81 to the control unit 45 in FIG. 2. Consequently, this operation can be attained by providing a signal line for feeding a reset signal from the control unit 45 to the block indicator parts 28 of the associative register 26 separate from the signal line 71.

Further, on the memory side, the gate circuit 94 and the signal lines 107 to 109 can be eliminated, at which time, when the buffer memory unit makes a write request, it is sufficient to turn off the indicator of the corresponding processor by the address signal set in the KAR 96. In this manner, the construction and operation can be simplified when the address signal is not supplied from the main memory to the buffer memory unit. However, even when all the block indicators are reset, the indicator in the key memory remains on. This indicator turns off when the address signal of the sector replaced in accordance with the instruction of the priority circuit 38 is supplied together with the indicator reset signal to the memory control unit 5. Consequently, although an excess time is required since the indicator is reset by the indication of the buffer memory, even such a construction is very effective because the probability that information in the main memory to be rewritten is read out and stored in the other buffer memory unit which has not made the write request is very low.

When the buffer memory unit supplies an indicator reset signal through the signal line 77 or 77', the memory control unit 5 receives the indicator reset signal in accordance with a predetermined priority as in the case of a write or read request being made, and sends a control signal to the selecting circuit 90 through the signal line 98 too. Then it selects an address signal from the buffer memory unit and sets it in the KAR 96, and sets a signal for turning off the indicator in the KDR 97 through the signal line 105 to write it in the key memory matrix 95. After the writing in has been completed, the memory control unit 5 supplies a response signal to the buffer memory unit through the signal line 65 or 65'.

FIG. 5 shows the circuit of a part of the memory control unit in FIG. 3, i.e. a buffer exception signal generating circuit. Indicators $P_1$ and $P_2$ of the processors 1 and 1' in the KDR 97 are made into logical products with signals WX2 and WX1 at AND circuits 110 and 111, and supplied to the buffer memory units 2 and 2', respectively. The signals WX1 and WX2 are signals which indicate the reception of write requests by the processors 1 and 1', respectively. Consequently, when a write request from the processor 1' is received by the memory control unit 5, and when the indicator in the processor 1 is in the on state, a buffer exception signal is generated on the signal line 81. When a write request from the processor 1 is received, and when the indicator in the processor 1' is in the on state, a buffer exception signal is generated on the signal line 81'. The output signals from the AND circuits 110 and 111 are made into a logical sum by an OR circuit 112 to serve as a control signal to the gate circuit 94.

FIG. 4 is an example of the construction of the priority circuit 38 in FIG. 2. A priority register apparatus 121 is comprised of a plurality of registers for storing address signals of sectors in the buffer memory. A comparator 122 compares an address signal of a sector in the buffer memory 25 supplied from the register 31 through the signal line 68 and a signal line 125 and address signals stored in the priority register apparatus 121 and supplied therefrom through a signal lines 126 to detect coincident ones and sets in register 123. After being compared in the comparator, the address signal in the priority register apparatus 121 is once set in a register for shift 124 through a signal line 127, and then again set in the priority register apparatus 121 through a signal line 129 by being controlled by a signal supplied from the register 123 to each register of the priority register apparatus 121 through a signal line 128. In this case, the sectors in which the signals are set from the register for shift 124 to the priority register apparatus 121 are ones which have higher priority than that showed the coincidence in the comparator 122. When the priority register apparatus 121 is set, the address signal stored in the register 31 is set in the uppermost register having the highest priority of the priority register apparatus 121 through a signal line 130. Consequently, in the priority register apparatus 121 the content of the register storing the address signal coincident with the address signal in the register 31 is shifted to the uppermost register, and the contents of the registers having had a higher priority than the said register are shifted to lower registers one by one. Although not shown in the figure, the operation of the priority circuit is controlled by the control signal from the control unit 45 in FIG. 2. Incidentally, what is set in the register 31 is the output signal of the decoder 39 when the register 33 is set, and the output signal of the lowest priority register of the priority register apparatus 121 when the register 33 is not set as described above.

It is evident that any other method of determining the priority than the one given in FIG. 4 can be utilized in the present invention. It is also to be noted that although the above description has been made with reference to a system having two processors, systems having three or more processors can similarly be constructed.

In systems in which an information handling unit such as an input device or the like directly performs a writing in a main memory without the intermediary of a processor, the incoincidence of information can be prevented according to the present invention by providing a key memory even in the case of having only one processor.

Figure 6:
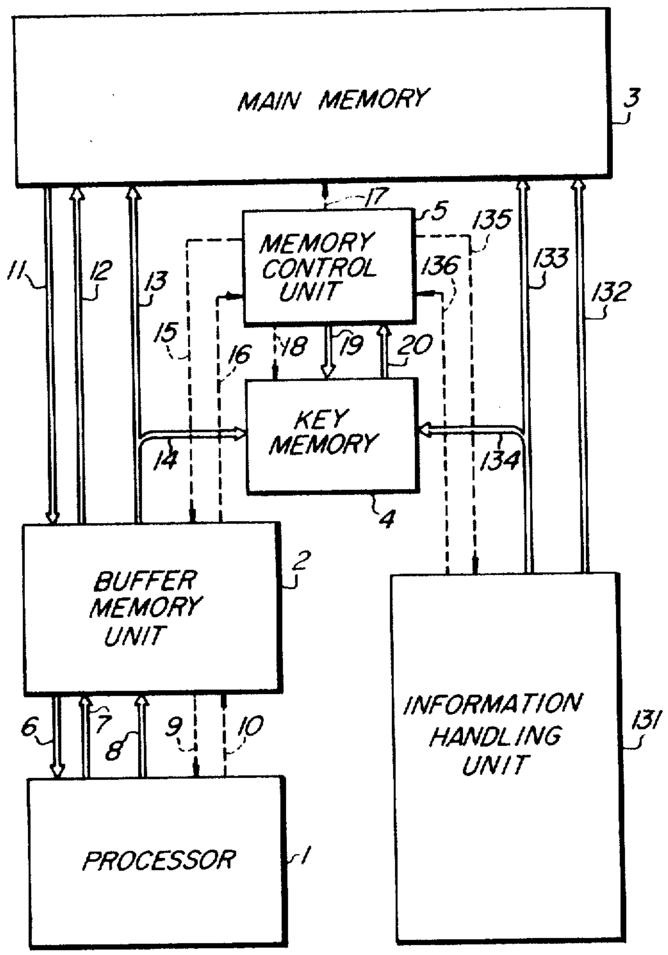
FIG. 6 is a block diagram of another embodiment of the present invention.

FIG. 6 shows another embodiment of the present invention. In this embodiment, an information handling unit 131 is provided instead of the buffer memory unit 2' and the processor 1' in the embodiment of FIG. 1, and signal lines 132 to 136 are provided instead of the signal lines 11' to 16'. The information handling unit 131 may be either of an I/O device, I/O channel, transmission control unit, processor having no buffer memory, and processor provided with a buffer memory, for example. A data line 132, address lines 133 and 134, and control lines 135 and 136 correspond to the line 12' to 16' in FIG. 1, respectively.

Consequently, when a write request is made to and received by the memory control unit 5 through the signal line 136, an address signal is supplied to the main memory 3 and key memory 4 through the address lines 133 and 134, and a data signal is stored in the main memory 3 through the data line 132. From the key memory 4 the indicator corresponding to the address signal is read out, and when the indicator is on, the address signal is fed to the buffer memory unit 2 through the data line 11 and resets all bits of the block indicator of the sector corresponding to the address signal in the buffer memory unit by being controlled by a buffer exception signal supplied through the control line 15. These operations are all the same as those of the embodiment of FIG. 1. However, since the number of processors having the buffer memory unit is one, the indicator in the key memory consists of one bit.

Needless to say, when the information handling unit is an I/O channel or processor, a data line for transmitting a data signal from the main memory 3 to the information handling unit 131 such as the data line 11' in FIG. 1 is provided. Also in the case where the number of the processors having the buffer memory unit is plural in the embodiment of FIG. 6, it is possible to prevent the incoincidence between the contents of the main memory and the buffer memories as is evident from the embodiment of FIG. 1. Further, in the case of the combination of a plurality of information handling units and one or more processors each having a buffer memory, the coincidence between the contents of the main memory and the buffer memory is prevented by checking the indicator in the key memory each time either one of the information handling units performs a writing in the main memory. Summarizing the above combination, the present invention is always applicable to a multiprocessing system including a main memory accessible in common by a plurality of information handling units in which one or more of the information handling units are processors each having a buffer memory to prevent to coincidence between the contents of memories.

As has been described above, according to the present invention a high speed processing of the multiprocessing system is possible without useless processing since information in the buffer memory is checked only when there is a danger of incoincidence between the stored sets of information in the main memory and the buffer memory. Furthermore, according to the present invention a very inexpensive system is provided because the incoincidence of information can be prevented by increasing the bit number of the key memory for memory protection and moreover the number of signal lines between processors is small.

We claim:

1. A memory control system in a multiprocessing system including a plurality of information handling units, and a main memory to which said information handling units are accessible in common, at least one of said information handling units being a processor provided with buffer memory means for storing the information read out from said main memory block by block, comprising a key memory for storing indicators each indicating whether or not information in said main memory is read out at each predetermined capacity and stored in said buffer memory means, means for setting the indicator corresponding to said predetermined capacity including said information in said key memory each time information is read out from said main memory, and means for checking the indicator corresponding to said information in said key memory each time information in said main memory is rewritten to make said information in said buffer memory means invalid.

2. A memory control system according to claim 1, in which said indicator checking means comprises means for reading out the indicator specified by the address of the information to be written in said key memory, and means for supplying a control signal to make said information invalid to said buffer memory means when the read out indicator is turned on.

3. A memory control system according to claim 1, in which each of said buffer memory means comprises a buffer memory composed of a plurality of sectors each consisting of a plurality of blocks, an associative register for storing the most significant bits of the address signals of the information stored in said sectors and block indicators each of which indicates the blocks storing valid information in said sector, means for comparing the most significant bits of an address signal fed from said processor and the most significant bits of the address signals stored in said associative register for checking, and means for checking said block indicators in accordance with the bits corresponding to the block of said address signal.

4. A memory control system according to claim 1, in which each of a plurality of ones of said information handling units comprises a processor including buffer memory means which reads out the information from said main memory and stores the information in said buffer memory means block by block.

5. A memory control system according to claim 1, in which said information handling units include at least one of I/O devices, I/O channels, transmission control units, and processors having no buffer memory.

6. A memory control system according to claim 3, comprising means for supplying, when said information in said sector of said buffer memory is to be replaced by fresh information in another sector, the address signal of said replaced information to said key memory to reset the corresponding indicator in said key memory.

7. A memory control system according to claim 4, in which each of said indicators stored in said key memory comprises a plurality of bits provided correspondingly to said buffer memory means for indicating whether or not information in said main memory is read out from said main memory and stored in each of said buffer memory means.

8. A memory control system according to claim 7, comprising means for checking said indicator comprised of said bits and for supplying, when buffer memory means other than that which made a write request stores the information, a control signal which invalidates said information to said buffer memory means storing said information.

9. A memory control system in a multiprocessing system comprising a plurality of processors, a main memory to which said processors are accessible in common, a plurality of buffer memory means provided correspondingly to said processors for storing the information read out from said main memory block by block, a key memory for storing indicators each indicating whether or not information in each predetermined capacity of said main memory is read out from said main memory and stored in said buffer memory means, means for setting said indicator in said key memory corresponding to said predetermined capacity including said information each time information in said main memory is read out, and means for invalidating said information in said buffer memory means by reading out the indicator corresponding to said information in said key memory each time information in said main memory is rewritten.

10. A memory control system according to claim 9, in which each of said indicators stored in said key memory comprises a plurality of bits provided correspondingly to said buffer memory means for indicating whether or not information in said main memory is read out from said main memory and stored in each of said buffer memory means.

11. A memory control system according to claim 9, in which each of said buffer memory means comprises a buffer memory composed of a plurality of sectors each consisting of a plurality of blocks, an associative register for storing the most significant bits of the address signals of the information stored in said sector and block indicators each of which indicates the block storing valid information in said sector, means for comparing the most significant bits of an address signal fed from said processor and the most significant bits of the address signals stored in said associative register for checking, and means for checking said block indicators in accordance with the bits corresponding to the block of said address signal.

12. A memory control system according to claim 10, comprising means for checking said indicator comprised of said bits and for supplying, when buffer memory means other than that which made a write request stores the information, a control signal which invalidates said information to said buffer memory means storing said information.

13. A memory control system according to claim 11, comprising means for supplying, when said information in said sector of said buffer memory is to be replaced by fresh information in another sector, the address signal of said replaced information to said key memory to reset the corresponding indicator in said key memory.